US012160139B2

(12) United States Patent
Thiele et al.

(10) Patent No.: US 12,160,139 B2
(45) Date of Patent: Dec. 3, 2024

(54) VARIABLE TORQUE CONSTANT ELECTRIC MACHINES HAVING A RADIAL SPOKED ROTOR WITH AXIAL FLUX MAGNET PLATES AND METHODS THEREOF

(71) Applicant: Regal Beloit Australia Pty Ltd, Rowville (AU)

(72) Inventors: Mark Thiele, Cape Woolamai (AU); Greg Heins, Rowville (AU); Dean James Patterson, Murwillumbah (AU)

(73) Assignee: REGAL BELOIT AUSTRALIA PTY LTD, Rowville (AU)

( * ) Notice: Subject to any disclaimer, the term of this patent is extended or adjusted under 35 U.S.C. 154(b) by 357 days.

(21) Appl. No.: 17/836,599

(22) Filed: Jun. 9, 2022

(65) Prior Publication Data

US 2023/0402885 A1  Dec. 14, 2023

(51) Int. Cl.
*H02K 1/27* (2022.01)
*H02K 1/276* (2022.01)
*H02K 1/28* (2006.01)
*H02K 29/03* (2006.01)

(52) U.S. Cl.
CPC .............. *H02K 1/2766* (2013.01); *H02K 1/28* (2013.01); *H02K 29/03* (2013.01); *H02K 2213/03* (2013.01)

(58) Field of Classification Search
CPC ........ H02K 1/2766; H02K 1/28; H02K 29/03; H02K 2213/03; H02K 1/30; H02K 21/16; H02K 1/2773
See application file for complete search history.

(56) References Cited

U.S. PATENT DOCUMENTS

| | | | |
|---|---|---|---|
| 6,844,647 B2 | 1/2005 | Horber | |
| 6,924,574 B2 | 8/2005 | Qu et al. | |
| 6,943,478 B2 | 9/2005 | Zepp et al. | |
| 6,987,342 B2 | 1/2006 | Hans | |
| 7,332,845 B2 | 2/2008 | Heideman et al. | |
| 7,471,026 B2 | 12/2008 | Bender | |
| 7,567,006 B2 * | 7/2009 | Ichiyama ............. | H02K 21/029 310/156.55 |
| 8,288,982 B2 | 10/2012 | Kauppi | |
| 8,373,326 B2 | 2/2013 | Enomoto et al. | |
| 8,390,232 B2 | 3/2013 | Kauppi | |
| 8,497,612 B2 | 7/2013 | Minowa et al. | |

(Continued)

OTHER PUBLICATIONS

Wang, Xiaoyuan et al., Field-Weakening Performance Improvement of the Yokeless and Segmented Armature Axial Flux Motor for Electric Vehicles; Energies 2017; vol. 10, 1492; doi:10.3390/en10101492; 12 pp.

(Continued)

*Primary Examiner* — Thomas Truong
(74) *Attorney, Agent, or Firm* — Armstrong Teasdale LLP

(57) ABSTRACT

Embodiments of the present disclosure are directed to a rotor assembly for use in a radial flux electric motor assembly having core magnets rotatable relative to end magnets such that the torque constant of the rotor assembly varies. The plurality of end magnets is positioned over the core magnets when the rotor assembly is at rest and the rotor assembly has a first torque constant at rest. The plurality of end magnets can rotate relative to the core magnets upon application of torque to the rotor assembly.

20 Claims, 12 Drawing Sheets

(56) References Cited

U.S. PATENT DOCUMENTS

| | | |
|---|---|---|
| 8,624,458 B2 | 1/2014 | Jack et al. |
| 8,680,736 B2 | 3/2014 | Wang et al. |
| 8,710,711 B2 | 4/2014 | Pennander et al. |
| 9,013,082 B2 | 4/2015 | Ge et al. |
| 9,048,712 B2 | 6/2015 | Lee et al. |
| 9,178,394 B2 | 11/2015 | Asahi et al. |
| 9,318,938 B2 | 4/2016 | Carpenter et al. |
| 9,343,934 B2 | 5/2016 | Zhao et al. |
| 9,472,997 B2 | 10/2016 | Figgins et al. |
| 9,502,929 B2 | 11/2016 | Yamada et al. |
| 9,590,459 B2 | 3/2017 | Hoemann |
| 10,069,357 B2 | 9/2018 | Ekin et al. |
| 10,122,223 B2 | 11/2018 | Takezaki et al. |
| 10,263,480 B2 | 4/2019 | Hunstable |
| 10,291,086 B2 | 5/2019 | Deak et al. |
| 10,742,083 B2 | 8/2020 | Hunter et al. |
| 10,763,711 B2 | 9/2020 | Han et al. |
| 10,794,780 B2 | 10/2020 | Paul et al. |
| 11,133,734 B2 | 9/2021 | Sandner et al. |
| 11,309,778 B2 | 4/2022 | Hunstable |
| 2010/0295389 A1 | 11/2010 | Tessier et al. |
| 2012/0217833 A1* | 8/2012 | Sakai ..................... H02K 21/04 310/156.01 |
| 2016/0006303 A1 | 1/2016 | Hoemann et al. |
| 2017/0366050 A1 | 12/2017 | Hattori et al. |
| 2019/0103791 A1 | 4/2019 | Goel et al. |
| 2020/0295610 A1 | 9/2020 | To et al. |
| 2022/0115936 A1 | 4/2022 | Hunstable |
| 2022/0123607 A1 | 4/2022 | Zhou et al. |

OTHER PUBLICATIONS

Liu, Xiping et al., "Comparative Design and Analysis of a New Type of Mechanical-Variable-Flux Flux-Intensifying Interior Permanent Magnet Motor;" Progress in Electromagnetics Research C, vol. 111, 2021; pp. 225-239.

Atallah, Kais et al., A Rotor with Axially and Circumferentially Magnetized Permanent Magnets, IEEE Transactions on Magnetics, Nov. 2012, vol. 48, No. 11, pp. 3230-3233.

Liu, Xiping et al., Comparative Design and Analysis of a New Type of Mechanical-Variable-Flux Flux-Intensifying Interior Permanent Magnet Motor, Progress in Electromagnetics Research C, 2021, vol. 111, 225-239.

* cited by examiner

VARIABLE TORQUE CONSTANT ELECTRIC MACHINES HAVING A RADIAL SPOKED ROTOR WITH AXIAL FLUX MAGNET PLATES AND METHODS THEREOF

BACKGROUND

The field of the disclosure relates generally to variable torque constant electric motors, and more particularly, to radially embedded permanent magnet rotors with axial flux magnet plates and methods of increasing flux density and specific torque.

Radial flux electric machines generally include spoked permanent magnets positioned within a rotor core, commonly referred to as an interior permanent magnet rotor. The rotor is formed from multiple laminations and circumferentially spaced poles. Slots are formed between adjacent poles, and spoke magnets are inserted into the slots. To further increase the efficiency of the motor, and prevent flux from leaking across laminations, the rotor can include axial magnets positioned above and below the spoke magnets. Flux leaks across lamination poles and radiates out axially from the rotor, which may induce eddy currents in nearby conductive structure. The leakage flux, while relatively small, can cause significant eddy current losses which has a detrimental effect on both torque and efficiency of the electric machine during operation.

Fixed torque constant motors having a fixed electronic drive current capacity are conventionally configured to provide high torque at low speed, or low torque at high speed, but not both. This restriction requires stator windings to be customized for specific speeds and torques leading to manufacturing complexity or oversizing the electronic drive to provide more current for the high torque demand situations leading to increased cost.

Conventional permanent magnet motors are configured to apply output torques for a range of speeds, up to a base speed limit. The speed is directly related to the build-up of back-emf electrical potentials in the motor as the rotational speed increases. Thus, the back-emf is limited by characteristics such as the flux density, the winding configuration and rotational speed. As the rotational speed of a permanent magnet motor increases, the back-emf will increasingly build up until a maximum back-emf of the motor is reached, at which point the rotor will not operate any faster. Thus, the back-emf and base RPM speed limit the dynamic rpm range.

Conventional fixed torque constant motors are configured and wound to provide high torque at low speed or high speed at low torque. Conventional variable torque constant motors include a means to alter the torque constant such that higher torques at lower speeds can be achieved. By way of example, a fixed reduction drive ratio attached to the motor can be configurable for high torque-low speed during startup or acceleration, and low torque-high speed during normal operation. Such configurations require additional parts, a greater space envelope and increased cost.

Thus, there is a need in the field for efficient electrical machines that have a high torque capability over a wide range of speed.

BRIEF DESCRIPTION

In one embodiment, a rotor assembly for use in a radial flux electric motor assembly is described. The rotor assembly includes a rotatable rotor shaft coupled to a rotor core, the rotor core comprising a plurality of rotor poles circumferentially spaced about a central axis of the rotor shaft, wherein said rotor core comprises a plurality of core magnets alternately spaced with said plurality of rotor poles; and, at least one end plate connected to the rotatable rotor shaft, the at least one end plate positioned over the rotor core, wherein the at least one end plate comprises a plurality of end magnets coupled to the at least one end plate. The plurality of end magnets is positioned over the core magnets when the rotor assembly is at rest, wherein the rotor assembly has a first torque constant at rest, wherein the plurality of end magnets can rotate relative to the core magnets upon application of torque to the rotor assembly, wherein the rotor assembly has an intermediate torque constant application of torque to the rotor assembly.

In another embodiment, an electric motor assembly is described. The electric motor assembly includes a stator assembly includes a stator core and a plurality of windings; and a rotor assembly including a rotor core rotor core comprising a plurality of rotor poles circumferentially spaced about a central axis of a rotatable shaft, wherein said rotor core comprises a plurality of core magnets alternately spaced with said plurality of rotor poles; at least one end plate connected to the rotatable rotor shaft, the at least one end plate positioned over the rotor core, wherein the at least one end plate comprises a plurality of end magnets coupled to the at least one end plate. The plurality of end magnets is positioned over the core magnets when the rotor assembly is at rest, wherein the rotor assembly has a first torque constant at rest, wherein the plurality of end magnets can rotate relative to the core magnets upon application of torque to the rotor assembly, wherein the rotor assembly has an intermediate torque constant application of torque to the rotor assembly.

DETAILED DESCRIPTION

Embodiments of the present disclosure are directed to a rotor assembly for use in a radial flux electric motor assembly having core magnets rotatable relative to end magnets such that the torque constant of the rotor assembly varies. The plurality of end magnets is positioned over the core magnets when the rotor assembly is at rest and the rotor assembly has a first torque constant at rest. The plurality of end magnets can rotate relative to the core magnets upon application of torque to the rotor assembly.

Figure 1:
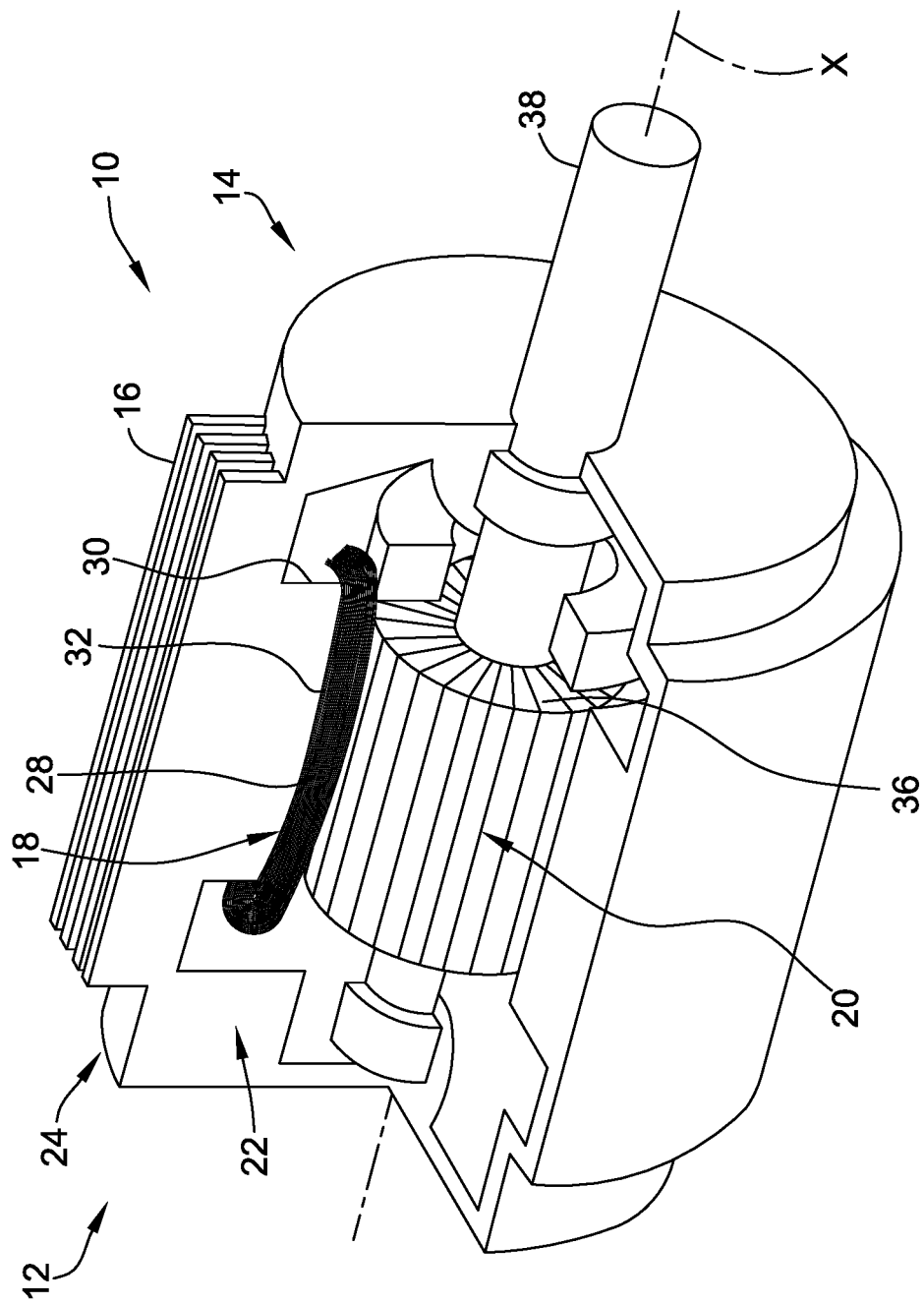
FIG. 1 is a perspective cut-away view of an exemplary electric motor assembly.

FIG. 1 is a perspective cut-away view of an exemplary electric motor 10. Although referred to herein as electric motor 10, electric motor 10 can be operated as either a generator or a motor. Electric motor 10 includes a first end 12, a second end 14, and a motor assembly housing 16. Electric motor 10 also includes a stator assembly 18 and a rotor assembly 20. Motor assembly housing 16 defines an interior 22 and an exterior 24 of motor 10 and is configured to at least partially enclose and protect stator assembly 18 and rotor assembly 20. Stator assembly 18 includes a stator core 28, which includes a plurality of teeth 30 and a plurality of windings 32 wound around stator teeth 30. Furthermore, in an exemplary embodiment, stator assembly 18 is a three-phase salient pole stator assembly and stator core 28 is formed from a stack of laminations made of highly magnetically permeable material. Alternatively, stator assembly 18 is a single-phase salient pole stator assembly. Stator assembly 18 may be a substantially round, segmented, or roll-up type stator construction and windings 32 are wound on stator core 28 in any suitable manner that enables motor 10 to function as described herein. For example, windings 32 may be concentrated type or distributed (overlapped) type windings.

Rotor assembly 20 includes a permanent magnet rotor core 36 and a shaft 38. In the exemplary embodiment, rotor core 36 is formed from a stack of laminations made of magnetically permeable material. Rotor core 36 is substantially received in a central bore of stator core 28 for rotation along an axis of rotation X. FIG. 1 illustrates rotor core 36 and stator core 28 as solid for simplicity. While FIG. 1 is an illustration of a three-phase electric motor, the methods and apparatus described herein may be included within motors having any number of phases, including single phase and multiple phase electric motors.

In the exemplary embodiment, electric motor 10 is coupled to a fan or centrifugal blower (not shown) for moving air through an air handling system, for blowing air over cooling or heating coils, and/or for driving a compressor within an air conditioning/refrigeration system. More specifically, motor 10 may be used in air moving applications used in the heating, ventilation, and air conditioning (HVAC) industry, for example, in residential applications using ⅕ horsepower (hp) to 1 hp motors. Motor 10 may also be used in commercial and industrial applications and/or hermetic compressor motors used in air conditioning applications, where motor may have a rating of greater than 1 hp. Although described herein in the context of an air handling system, electric motor 10 may engage any suitable work component and be configured to drive such a work component.

Figure 2:
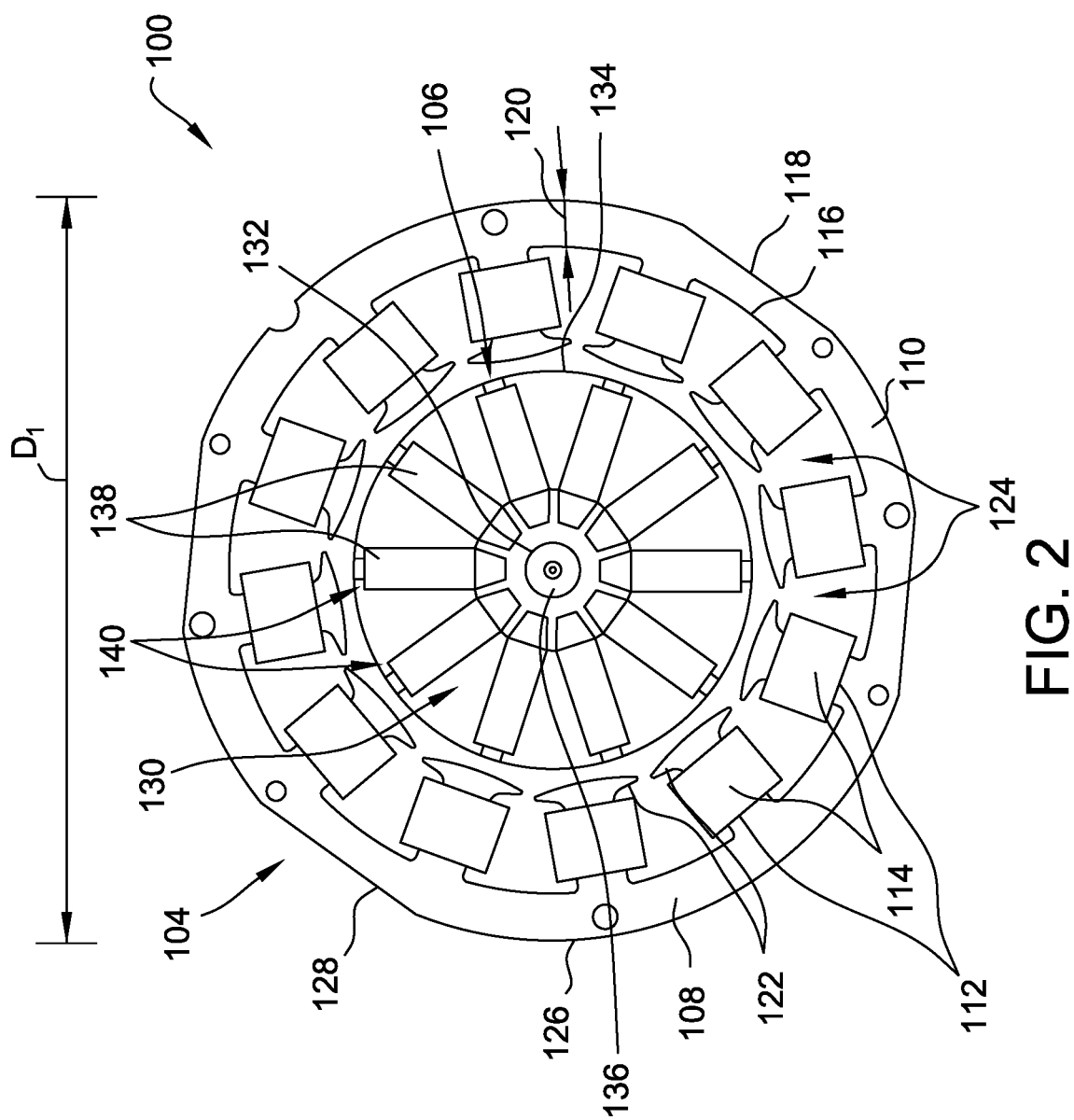
FIG. 2 is an end view of a stator assembly and a rotor assembly of the electric motor assembly shown in FIG. 1.
Figure 3:
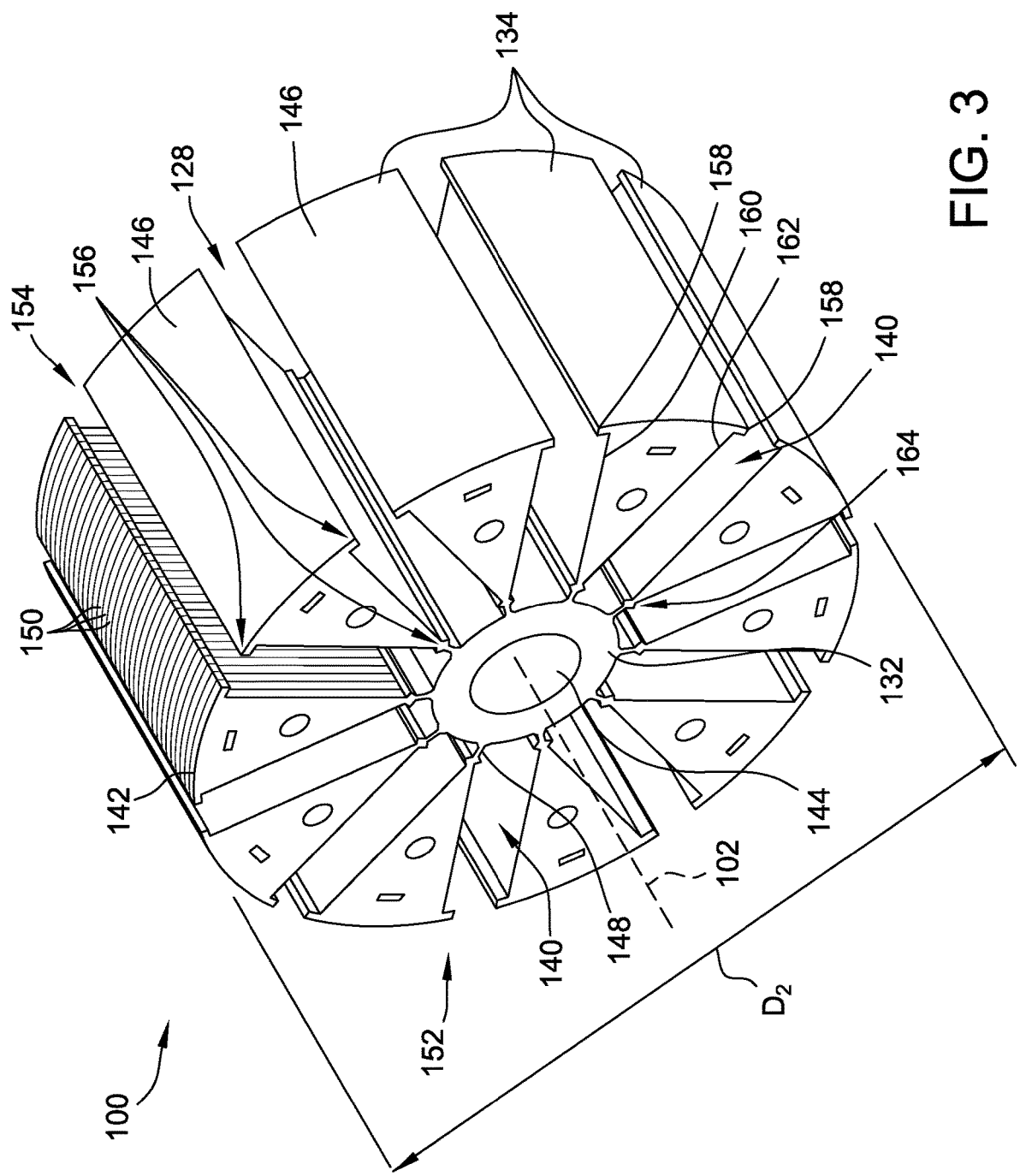
FIG. 3 is a perspective view of an exemplary rotor core that may be included within the electric motor assembly shown in FIG. 1.

FIG. 2 is a cross-sectional end view of an exemplary electric motor 100 having a central axis 102 (as shown in FIG. 3) and that includes a stator assembly 104 and a rotor assembly 106. Stator assembly 104 includes an annular core 136 having a stator yoke or base 110 and a plurality of stator teeth 112 extending radially inward from base 110. In the exemplary embodiment, a plurality of windings 114 are wound around stator teeth 112 such that each tooth 112 includes a single winding 114. In other embodiments, stator assembly 104 includes one winding 114 for every other tooth 112.

Stator base 110 includes an inner surface 116 and an outer surface 118. Inner surface 116 and outer surface 118 which extend about central axis 102 (as shown in FIG. 3) and are spaced radially apart. Inner surface 116 and outer surface 126 define a thickness 120 of base 110 therebetween. In alternative embodiments, stator assembly 104 includes any base 110 that enables motor assembly 100 to operate as described herein.

Also, in the exemplary embodiment, stator assembly 104 has an outer diameter D1 defined by base 110. In some embodiments, the outer diameter D1 is in a range of about 100 mm (4 inches (in.)) to about 400 mm (14 in.). For example, in some embodiments, base 110 has an outer diameter of approximately 240 mm (9.5 in.) or approximately 310 mm (12.2 in.). In alternative embodiments, stator assembly 104 has any diameter that enables motor assembly 100 to operate as described herein.

In addition, in the exemplary embodiment, stator teeth 112 extend radially from base 110. In some embodiments, stator teeth 112 are integral with base 110. In further embodiments, stator teeth 112 are coupled to base 110. In the exemplary embodiment, each stator tooth 112 includes a distal tip 122 that is positioned proximate to rotor assembly 106.

In addition, in the exemplary embodiment, stator teeth 112 are spaced circumferentially about base 110 and define slots 124 therebetween. Stator teeth 112 are configured to receive conduction coils or windings 114 such that windings 114 extend around teeth 112 and through slots 124. In some embodiments, stator teeth 112 define no more than 24 slots. In the exemplary embodiment, stator assembly 104 includes eighteen stator teeth 112 defining eighteen slots 124. In alternative embodiments, motor assembly 100 includes any number of stator teeth 112, such as twelve, that enable motor assembly 100 to operate as described herein.

In some embodiments, stator assembly 104 is assembled from a plurality of laminations. Each of the plurality of laminations is formed in a desired shape and thickness. The laminations are coupled together to form stator assembly 104 having the desired cumulative thickness. In further embodiments, stator assembly 104 includes a first configuration, e.g., a flat or strip configuration, and a second configuration, e.g., a round configuration. Stator assembly 104 is moved or "rolled" from the first configuration to the second configuration to form a roll-up stator assembly 104 having a substantially cylindrical shape. In alternative embodiments, stator assembly 104 is assembled in any manner that enables stator assembly 104 to function as described herein.

Also, in the exemplary embodiment, outer surface 118 includes curved portions 126 and straight portions 128. Curved portions 126 extend circumferentially about base 110. Straight portions 128 extend along chords between curved portions 126. In addition, curved portions 126 and straight portions 128 extend longitudinally relative to central axis 102 from a first end to a second end of base 110. Curved portions 126 provide increased strength to base 110 to increase hoop stress capacity and resist deformation of base 110. In alternative embodiments, outer surface 118 includes any portion that enables motor assembly 100 to operate as described herein. For example, in some embodiments, outer surface 118 is curved about the entire periphery of base 110.

With continued reference to FIG. 2, rotor assembly 106 includes a rotor core 130 having a hub portion 132, and a plurality of rotor poles 134 circumferentially spaced about hub portion 132. Hub portion 132 includes an opening configured to receive a rotatable shaft 136 therethrough that is coupled to a load. In the exemplary embodiment, rotor core 130 also includes a plurality of core magnets 138 alternately spaced with the plurality of rotor poles 134. The plurality of rotor poles 134 define a radial aperture 140 between each pair of circumferentially adjacent rotor poles 134, and each radial aperture 140 is configured to receive at least one core magnet 138 therein.

Accordingly, in the exemplary embodiment, rotor assembly 106 is a spoked rotor and is configured to provide increased magnetic flux in comparison to at least some known rotor assemblies. Stator assembly 104 is configured to provide capacities for the increased magnetic flux and the increased hoop stress due to the increased magnetic flux. In alternative embodiments, motor assembly 100 includes any rotor assembly 106 that enables motor assembly 100 to operate as described herein.

FIG. 3 is a perspective view of rotor core 130 illustrating the plurality of rotor poles 134 that may be included within the radial flux electric motor assembly 100 shown in FIG. 2. In the exemplary embodiment, rotor assembly 106, also referred to as a radially embedded permanent magnet rotor, includes rotor core 130 and shaft 136. Examples of motors that may include the radially embedded permanent magnet rotors include, but are not limited to, electronically commutated motors (ECM's). ECM's may include, but are not limited to, brushless direct current (BLDC) motors, brushless alternating current (BLAC) motors, and permanent magnet assisted variable reluctance motors. Furthermore, rotor assembly 20 is driven by an electronic control (not shown), for example, a sinusoidal or trapezoidal electronic control.

Rotor core 130 is substantially cylindrical and includes an outer periphery 142 and a shaft central opening 144 having a diameter suitable for the diameter of shaft 136. Rotor core 130 and shaft 136 are concentric and are configured to rotate about axis of rotation (the central axis 102). In the exemplary embodiment, rotor core 130 includes the plurality of circumferentially spaced rotor poles 134 each having an outer wall 146 along rotor outer periphery 142. Further, rotor core 130 includes a rotor diameter D2 defined between midpoints of outer walls 146 of opposing rotor poles 134. As used herein, the term "substantially cylindrical" is meant to describe that the rotor core 130 includes a generally circular or oval cross-section but is not required to be perfectly circular. For example, rotor core 130 may include one or more flattened or planar portions distributed about outer periphery 142, or outer walls 146 of rotor poles 134 may include a different radius than the overall rotor core 130 or even different radii between circumferential ends of each pole 134. Although described in relation to rotor core 130, the term "substantially cylindrical" applies to each rotor core of the disclosure.

As shown in FIG. 3, in the exemplary embodiment, each rotor pole 134 is coupled to hub portion 132 by a web 148. Hub 132 defines shaft opening 144. In other embodiments, less than all of rotor poles 134 may be coupled to hub 132. Furthermore, in the exemplary embodiment, rotor core 130, and therefore each rotor pole 134, is formed by a plurality of stacked laminations 150 that are coupled together by interlocking, adhesive, welding, bolting, or riveting, or any other type of connecting technique known in the art. For example, laminations 150 are fabricated from multiple punched layers of stamped metal such as steel.

Furthermore, in the exemplary embodiment, rotor core 130 includes the plurality of radial apertures 140 alternately spaced with rotor poles 134. Each radial aperture 140 is configured to receive one or more permanent magnets 138 such that each magnet 138 is radially embedded in rotor core 130 and extends at least partially from a rotor first end 152 to a rotor second end 154. In the exemplary embodiment, radial apertures 140 are generally rectangular. Alternatively, radial apertures 140 may have any suitable shape corresponding to the shape of the permanent magnets that enables the electric motor to function as described herein. In the exemplary embodiment, permanent magnets 138 are ceramic magnets magnetized in a direction tangent to axis of rotation X. However, magnet 138 may be fabricated from any suitable material that enables motor 10 to function as described herein, for example, bonded neodymium, AlNiCo, sintered neodymium, bonded and ceramic ferrite, and/or samarium cobalt.

In the exemplary embodiment, the number of radial apertures 140 is equal to the number of rotor poles 134, and one magnet 138 is positioned within each radial aperture 140 between a pair of rotor poles 134. Although illustrated as including ten rotor poles 134, rotor core 130 may have any number of poles that allows motor 100 to function as described herein, for example, six, eight or twelve poles.

In the exemplary embodiment, each rotor pole 134 includes one or more permanent magnet retention members or protrusions 156. For example, a first pair of protrusions 158 is located proximate pole outer wall 146 along rotor outer edge 142 and extends into adjacent radial apertures 140 from circumferential end walls 160 and 162. Each protrusion 156 of the first pair of protrusions 158 is configured to facilitate retention of magnet 138 within radial aperture 140 by substantially preventing movement of magnet 138 in a radial direction towards outer edge 142. Further, a second pair of protrusions 164 is located proximate web 148 and extend adjacent radial apertures 140 from circumferential end walls 160 and 162. Each protrusion 156 of the second pair of protrusions 164 is configured to facilitate retention of magnet 138 within radial aperture 140 by substantially preventing movement of magnet 138 in a radial direction towards shaft 136. Alternatively, rotor core 130 may have any number and location of protrusions 156 that enable rotor core 130 to function as described herein.

Figure 4:
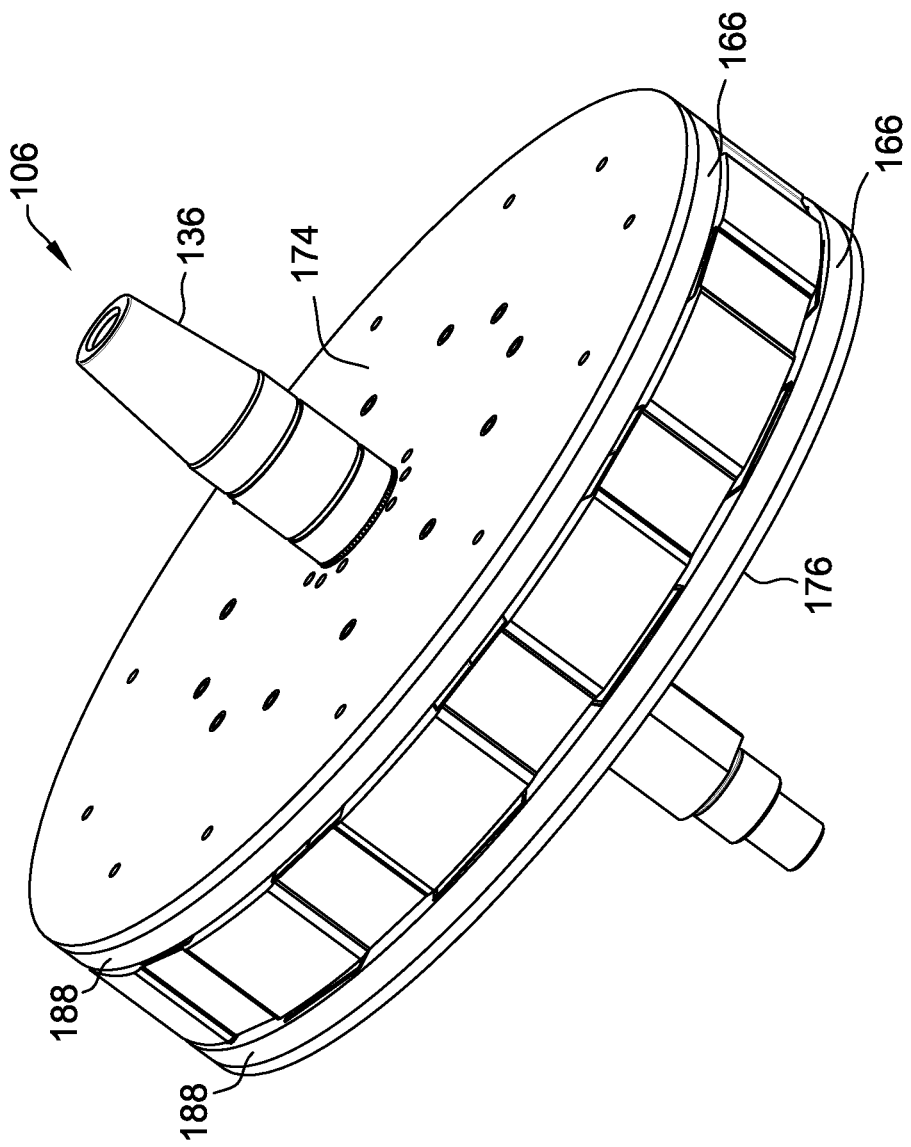
FIG. 4 is a perspective view of an exemplary rotor assembly that includes the rotor core shown in FIG. 3 and that may be included within the electric motor assembly shown in FIG. 1.
Figure 5:
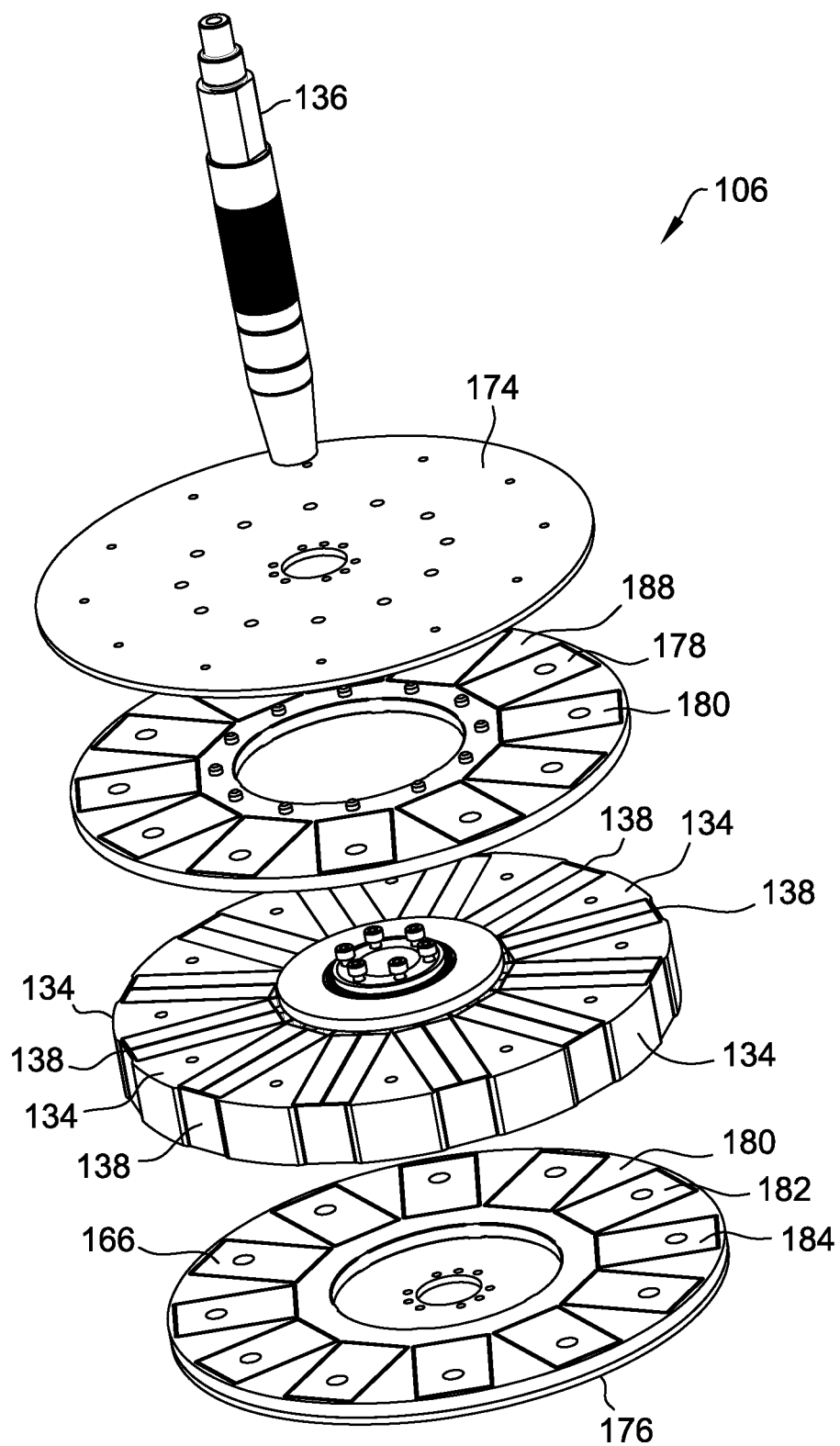
FIG. 5 is a partially exploded view of the rotor assembly shown in FIG. 4.

FIG. 4 illustrates a perspective view of rotor assembly 106 that includes the rotor core 130 shown in FIG. 2 and that may be included within the electric motor assembly 100 shown in FIG. 1. FIG. 5 illustrates an exploded view of the rotor assembly 106 of FIG. 4. The rotor assembly 106 includes a first end plate 174 coupled to a first plurality of end magnets 166 and a second end plate 176 coupled to second plurality of end magnets 166. Eddy current losses into surrounding conductive structures can be eliminated or reduced by preventing flux leakage from the axial face of radial spoke rotors. End plates 174 and 176 provide a barrier to the flux radiating from rotor core 130 into the surrounding structure of motor assembly 100 and therefore eliminates eddy current losses. In the exemplary embodiment, end plates 174 and 176 are formed from a magnetic material, such as but not limited to ferritic steel and magnetic stainless steel. Alternatively, end plates 174 and 176 are formed from any material that facilitates operation of rotor assembly 106 as described herein. In some embodiments, end plates 174 and 176 may cause flux shorting, which may reduce the overall torque of motor assembly 100. In the exemplary embodiment, end magnets 166 are added to rotor assembly 106 to restore flux, resulting in substantial increases in both torque and efficiency. More specifically, first plurality of end magnets 166 is positioned between first end 152 of rotor core 130 and first end plate 174. Similarly, second plurality of end magnets 166 is positioned between second end 154 of rotor core 130 and second end plate 176.

The rotor assembly 106 further includes a pair of frames 188 coupled to the end plates 174 and 176. Each frame 188 includes a plurality of circumferentially spaced openings 190 configured to receive the plurality of end magnets 166 therein. In such an embodiment, frame 188 defines a substantially similar diameter as the end plates 174 and 176 and is made of a non-magnetic material, such as but not limited to plastic, so as not to interfere with the flow of flux between rotor core and end magnets 166

In the exemplary embodiment, a first plurality of end magnets 166 of the first end plate 174 comprises a first subset 178 having a first polarity and a second subset 180 having a second polarity different from the first polarity. Similarly, second plurality of end magnets 166 of the second end plate 176 comprises a first subset 182 having a first polarity and a second subset 184 having a second polarity different from the first polarity. As shown in FIG. 5, first subset 182 is alternately spaced with second subset 184 of end magnets 166. Stated differently the plurality of end magnets 166 alternate polarity between adjacent end magnets. In some embodiments, end magnets 166 of first subset 182 and second subset 184 abut against one another without any structural holder.

Each end magnet 166 at least partially covers an interface 186 between a rotor pole 134 and an adjacent core magnet 138. More specifically, each end magnet 166 will at least partially overlap with a corresponding rotor pole 134 and core magnet 138 such that end magnets 166 provide a path for flux to flow between rotor pole 134 and core magnet 138. Alternatively, in cases where end magnets 166 may not cover interface 186, a circumferential edge of end magnets 166 is flush with a circumferential edge of the corresponding rotor pole 134. However, as explained in further detail below, the position of each end magnet 166 relative to the corresponding rotor pole 134 and core magnet 138 can be adjusted such that the path for flux to flow between rotor pole 134 and core magnet 138 varies. By adjusting the position of each end magnet 166 relative to the core magnet 138, the torque constant of the electric motor 100 can be changed such that the motor 100 can operate at high torque state, or a low torque, high speed state, or in a state in-between. Stated differently, adjusting the circumferential position of all end magnets 166 relative to the core magnets 138 can optimize the function and efficiency of the motor 100 by changing the torque constant of the motor. In some embodiments, each end magnet 166 abuts the core magnets 138. In some embodiments, each end magnet 166 is positioned a distance from the core magnets 138.

Figure 6:
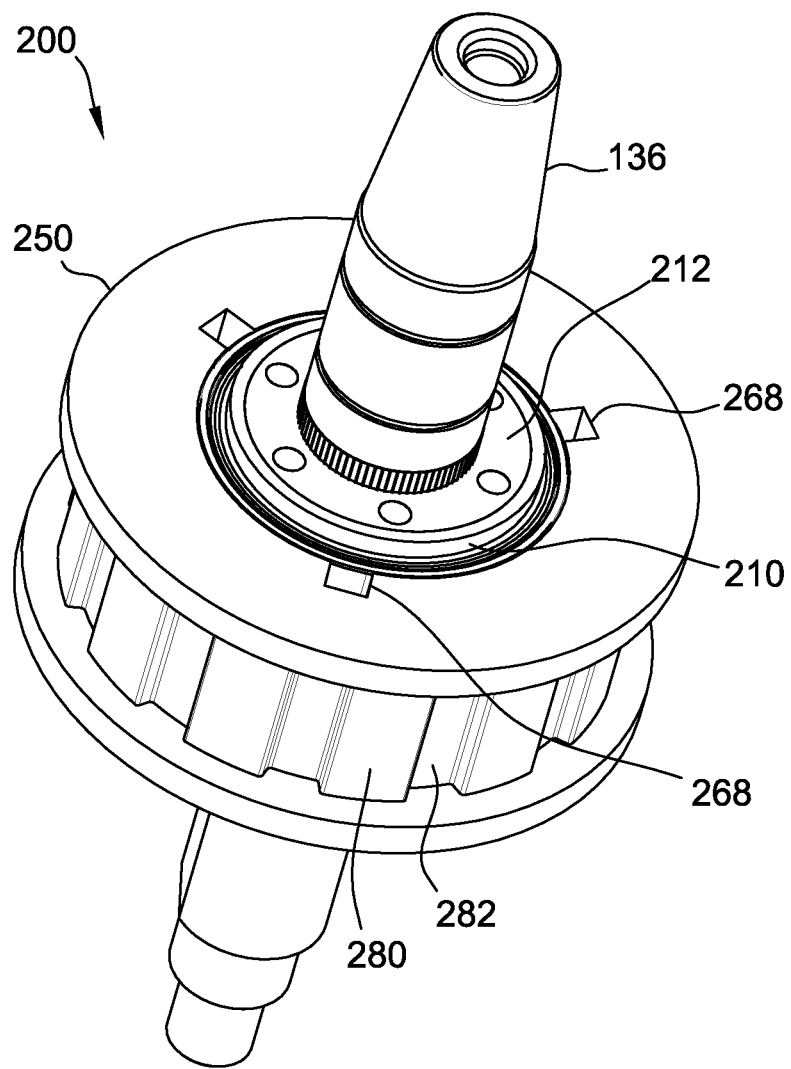
FIG. 6 is perspective view of a hub assembly that may be included within the rotor assembly as shown in FIG. 4.
Figure 7:
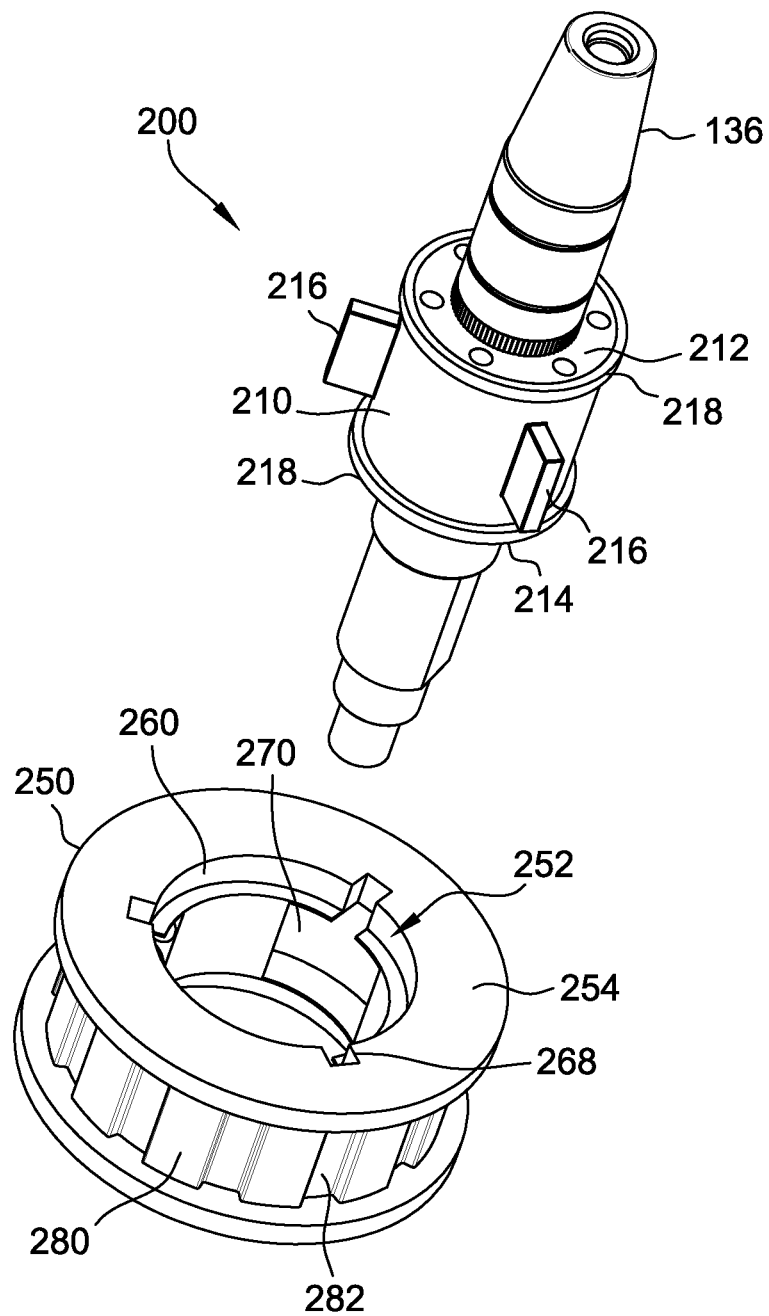
FIG. 7 is a partially exploded view of the hub assembly of FIG. 6.
Figure 8:
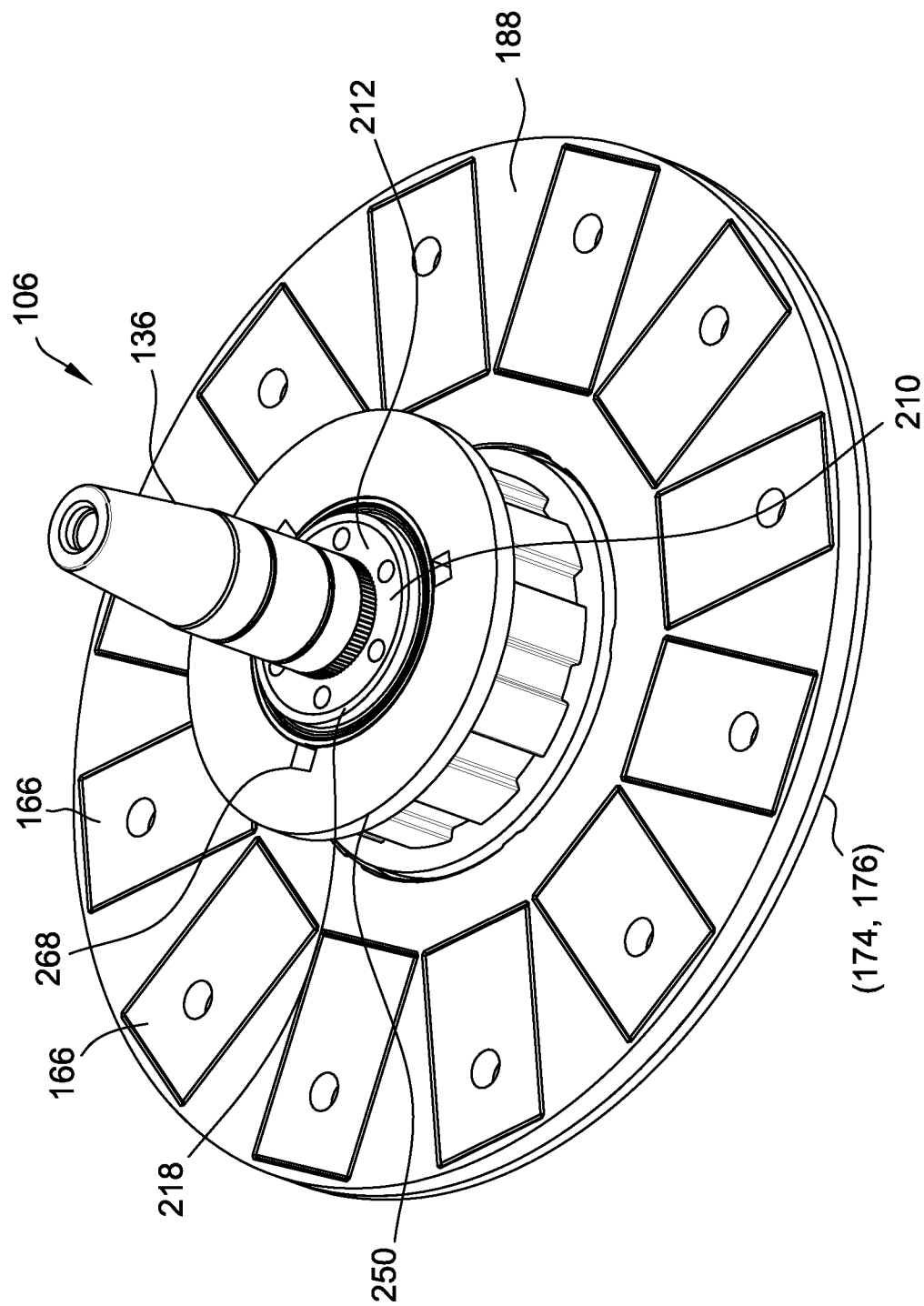
FIG. 8 is a perspective view of a hub assembly that may be included within the rotor assembly as shown in FIG. 4.

FIG. 6 illustrates a perspective view of a hub assembly 200 and FIG. 7 illustrates an exploded view of the hub assembly 200. FIG. 8 illustrates the hub assembly 200 affixed to one of the end plates (174, 176). The hub assembly includes an inner hub 210 and a drum 250 surrounding the inner hub 210. The inner hub 210 has a cylindrical body including an opening configured to receive the rotatable shaft 136 therethrough that is coupled to a load and rotates with the rotatable shaft 136. A first surface 212 and a second surface 214 opposite the first surface 212 are coupled to the end plates (174, 176). The inner hub 210, end plates (174, 176) and frames 188 rotate at the same rotational speed as the shaft 136 rotates. In some embodiments, the inner hub 210 includes at least one tab 216 extending from an outer surface of the cylindrical body. The at least one tab 216 extends longitudinally on the outer surface and each tab 216 is spaced by an equal radial distance to an adjacent tab 216. The at least one tab 216 is configured to interdigitate with the drum 250.

Figure 9:
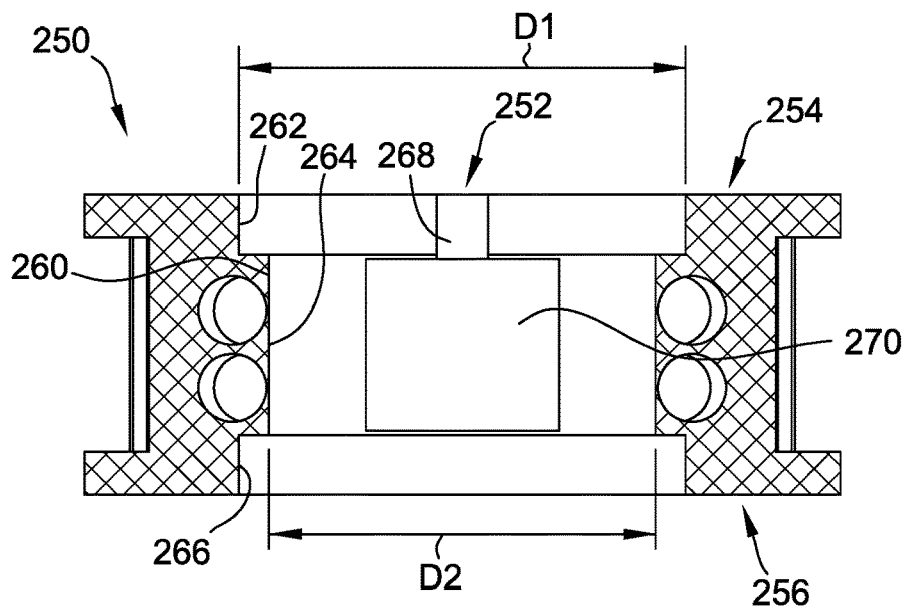
FIG. 9 is a cross-sectional view of an exemplary drum that may be included within the hub assembly as shown in FIG. 6.
Figure 10:
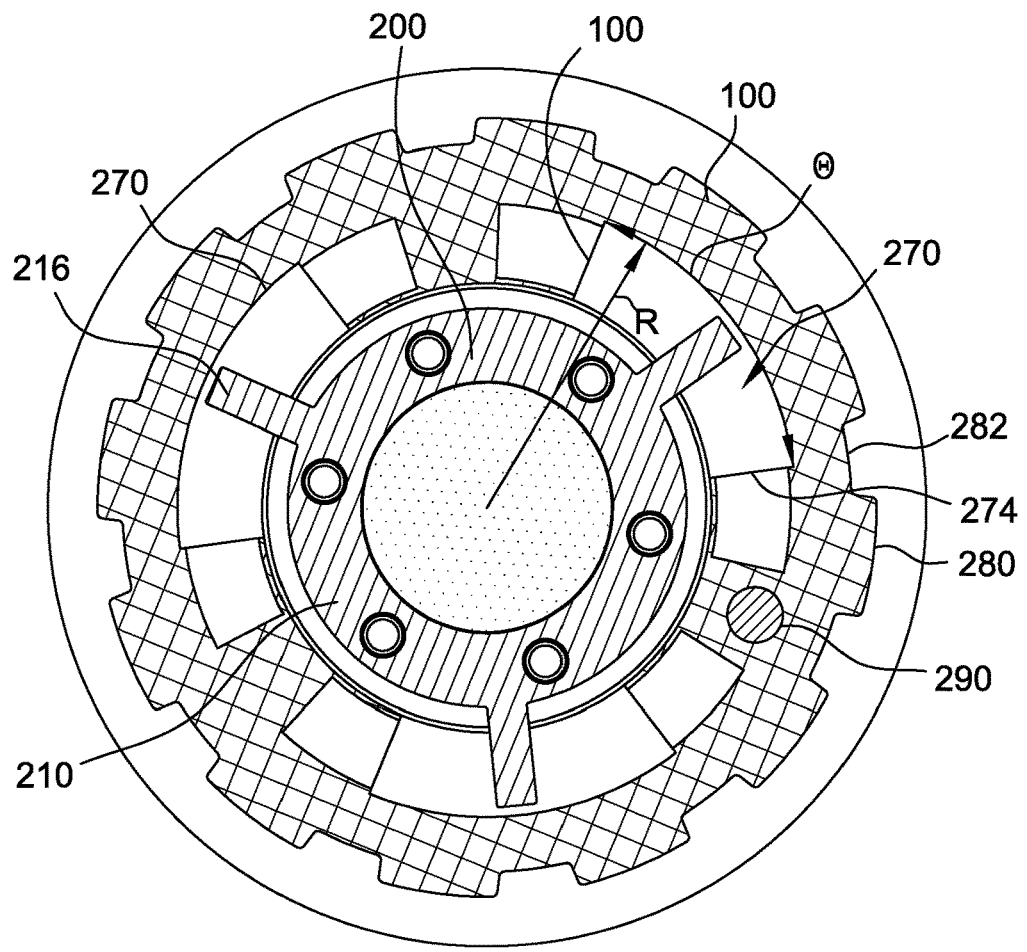
FIG. 10 is a cross-sectional view of the hub assembly as shown in FIG. 6.
Figure 11:
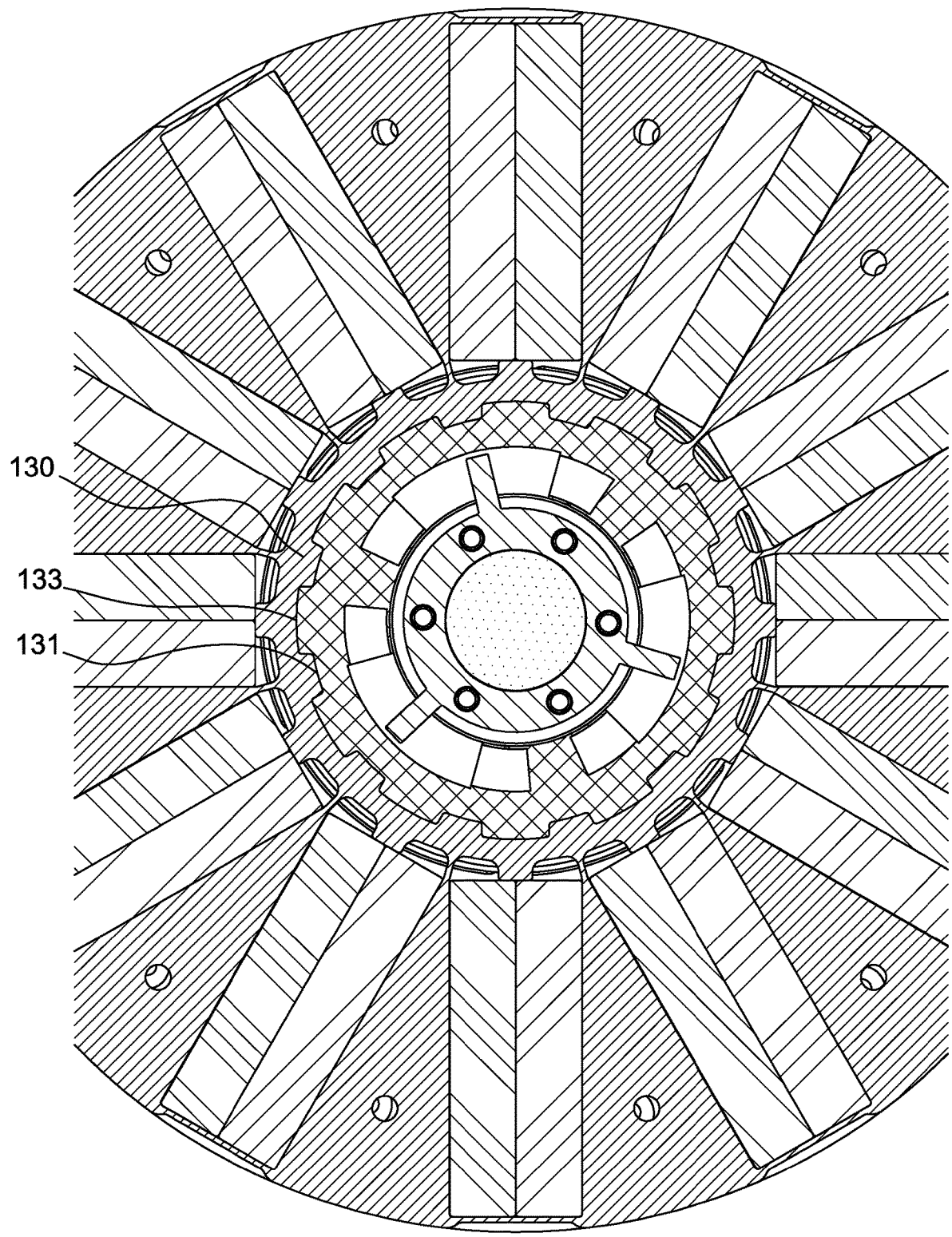
FIG. 11 is a cross-sectional view of the rotor assembly shown in FIG. 4.

FIG. 9 illustrates a side cross-sectional view of the drum 250 of the hub assembly 200. FIG. 10 illustrates a top cross-sectional view of the hub assembly 200. FIG. 11 illustrates a top cross-sectional view of the rotor assembly 106. The drum 250 has a cylindrical body having a first surface 254 and a second surface 256 opposite the first surface 254. An outer surface 280 of the drum 250 includes a plurality of notches 280 extending into the outer surface 280. The plurality of notches 280 of the drum 250 are configured to interdigitate with a corresponding plurality of notches 133 of the rotor core 130 positioned on an inner surface 131 of the rotor core 130.

An aperture 252 extends through the body defining an inner sidewall 260 having a first portion 262 and a second portion 264. The first portion 262 has a diameter D1 greater than a diameter D2 of the second portion 264. The first portion 262 is adjacent to the top surface 254 and the second portion 264 is adjacent to the first portion 262. In some embodiments, a third portion 266 having in the illustrated embodiment an equal diameter to the first portion 262 is adjacent to the second portion 264 and the second surface 256 of the drum 250. The diameter D2 of the second portion 264 is less than a diameter of the inner hub 210 such that the inner hub 210 can be inserted into the aperture 252 of the drum 250. In some embodiments, the inner hub 210 is secured within the aperture 252 of the drum 250 by spacer rings 218 abutting the first surface 212 and second surface 214 of the inner hub 210. The spacer rings 218 have a diameter greater than the diameter D2 of the second portion 264 but less than the diameter D1 of the first portion 262. Thus, by inserting the inner hub 210 into the aperture 252 of the drum 250 and subsequently attaching the spacer rings 218 to the inner hub 210, the inner hub 210 is removably positioned within the drum 250 and can rotate freely relative to the inner hub 210. The spacer rings 218 are configured to centralize the spoked magnet and lamination sub-assembly to the outer magnets and shaft sub-assembly.

The second portion 264 includes at least one radial pocket 270 extending partially through the inner sidewall 260. The at least one radial pocket 270 is in the form of an arc having a radius R and an arc angle θ. The radius R of the at least one radial pocket 270 is sized and configured to receive the at least one tab 216 of the inner hub 210 such that the at least one tab 216 (and thus the inner hub 210) can rotate within the at least one radial pocket 270. Stated differently, the radius R is greater than a radius of the at least one tab 216 of the inner hub 210 relative to the inner hub 210. As best shown in FIGS. 7 and 9, the first portion 262 of the drum 250 includes a notch 268 having a radius greater than the radius of the at least one tab 216 of the inner hub 210 such that the at least one tab 216 and inner hub 210 can be inserted into the at least one radial pocket 270 and the drum 250 Subsequent attachment of the spacer rings 218 to the inner hub 210 removably positions the at least one tab 216 into the at least one radial pocket 270. Furthermore, the spacer rings 218 are configured to center the core magnet 138 relative to the end magnets 166. The arc angle θ limits rotation of the at least one tab 216 (and thus the inner hub 210 within the at least one radial pocket 270. Stated differently, the at least one radial pocket 270 defines a first stop 272 and a second stop 274 at the ends of the least one radial pocket 270. The at least one tab 216 can travel between the first stop 272 and the second stop 274, thus limiting the rotation of the at least one tab 216 within the at least one radial pocket 270 by the arc angle θ. The terms "stop" and "end" with reference to the at least one radial pocket 270 are used interchangeably.

In some embodiments, the at least one tab 216 is freely positioned within the at least one radial pocket 270 as shown in FIG. 10. Because the inner hub 210 is coupled to the end plates 174 and 176 (and thus the end magnets 166), and the drum 250 is coupled to the rotor core 130 (and thus the core magnets 138), when the at least one tab 216 is freely positioned within the at least one radial pocket 270, the magnetic forces exerted between the end magnets 166 and the core magnets 138 hold the least one tab 216 in place at rest. In particular, the at least one tab 216, at least one pocket 270, the end magnets 166 and core magnets 138 are configured and positioned relative to one another to hold the least one tab 216 in place at rest. As used herein, the terms "rest" and "at rest" shall denote an equilibrium of magnetic forces between the end magnets 166 and the core magnets 138 such that the at least one tab 216 is positioned equidistant between the first stop 272 and a second stop 274 of the at least one radial pocket 270 as shown in FIG. 10.

As equilibrium is disrupted by application of torque onto the drum 250 relative to the inner hub 210, external torque opposes the magnetic repulsion within the rotor which in turn causes the least one tab 216 to rotate relative to the at least one radial pocket 270. The at least one tab 216 can rotate in either direction from rest by an intra-rotor angle. At rest, the intra-rotor angle is zero, meaning that the at least one tab 216 is held equidistant between the first stop 272 and second stop 274. The intra-rotor angle is half of the angle θ and is measured in positive degrees in either rotational direction. By way of example, if the at least one radial pocket 270 has an angle θ of 50 degrees, the one tab 216 is at rest 25 degrees from one of the ends and the at least one tab 216 is rotatable in 25 degrees in either direction. In some embodiments, the arc angle θ is 25 degrees. In some embodiments, the arc angle θ is 50 degrees. In some embodiments, the arc angle θ is in the range of degrees to 90 degrees. The range of degrees is ultimately determined by the size and relative positions of the end magnets 166 and the core magnets 138. The angle θ is calculated by dividing 360 degrees by the maximum number of core magnet 138 poles. By way of example, for a 12-pole rotor, the angle θ is 30 degrees. Likewise, for a 20-pole rotor, the angle θ is 18 degrees. In some embodiments, dampeners such as biasing elements, springs or rubber bushes can be positioned between the at least one tab 216 and the at least one radial pocket 270 of the drum 250. Dampeners can partially limit the inertia exerted onto the at least one tab 216 and the at least one radial pocket 270.

By adjusting or shifting the position of each end magnet 166 relative to the core magnet 138, the back EMF characteristics of the motor 100 can be adjusted such that the torque constant of the motor 100 changes for a high torque state, a low torque high speed state, or in a state in-between. The intra-rotor angle thus defines an angle by which the end magnets 166 shift relative to the core magnets 138, altering path for flux to flow between end magnets 166 and core magnets 138.

Figure 12:
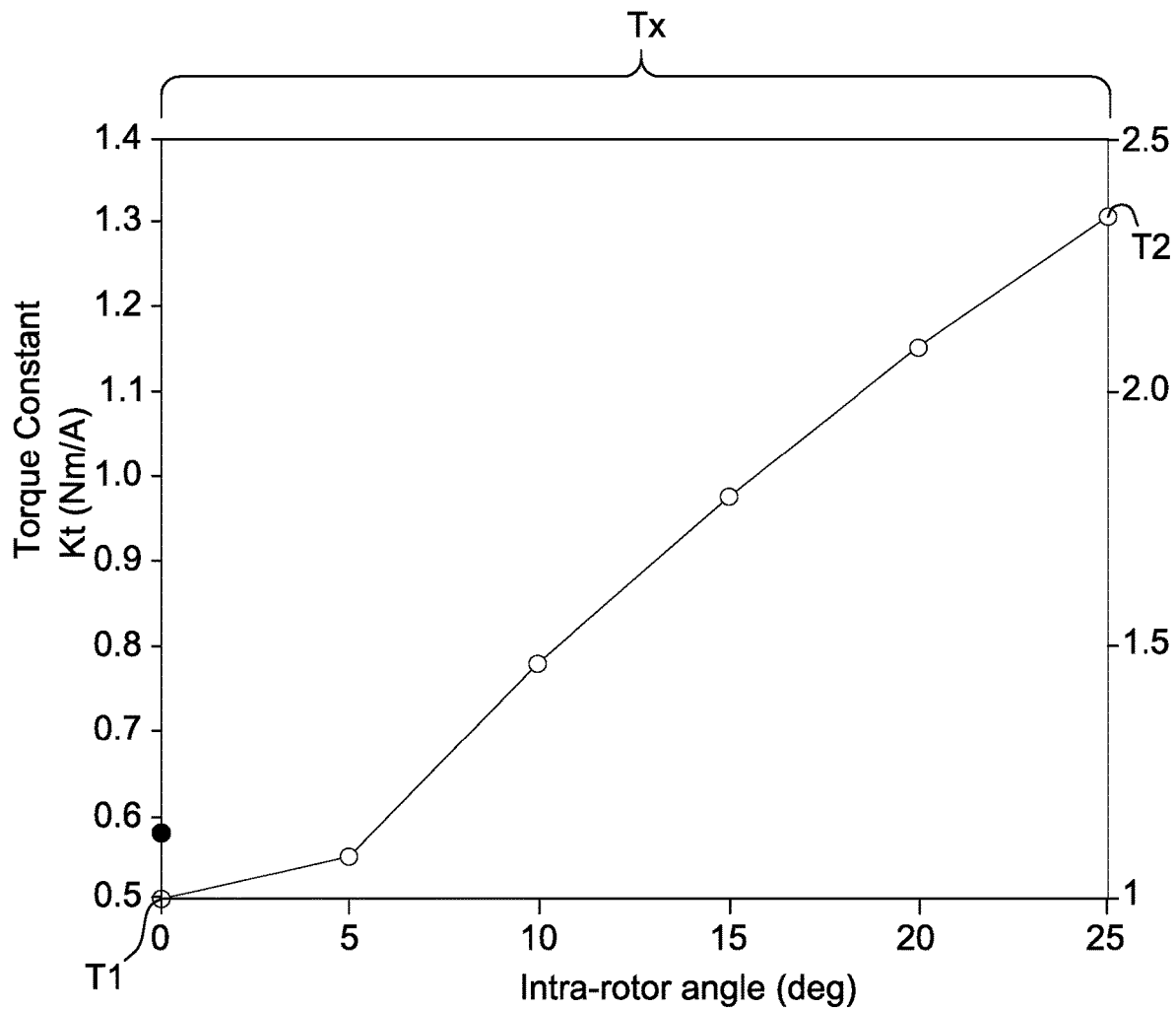
FIG. 12 is a torque constant graph of rotor assembly as shown in FIG. 4.

The torque constant has a first value of T1 at rest, a second value of T2 when the at least one tab 216 is at either of the first stop 272 and a second stop 274, and an intermediate value of Tx when the at least one tab 216 is between rest and either of the first stop 272 and a second stop 274. The torque constant value of T1 is less than the torque constant value of T2, and the torque constant value Tx is more than the torque constant value T1 and less than the torque constant value T2. The torque constant value T1 corresponds to a low torque high speed state, the torque constant value T2 corresponds to a high torque state, and the torque constant value Tx corresponds to an intermediate state. FIG. 12 illustrates an exemplary motor torque constant profile. As shown, increasing the intra-rotor angle (angle θ) between the end magnets 166 relative to the core magnets 138 increases the flux concentration of the end magnets and core magnets 138, and therefore the torque constant of the motor 100.

Figure 13:
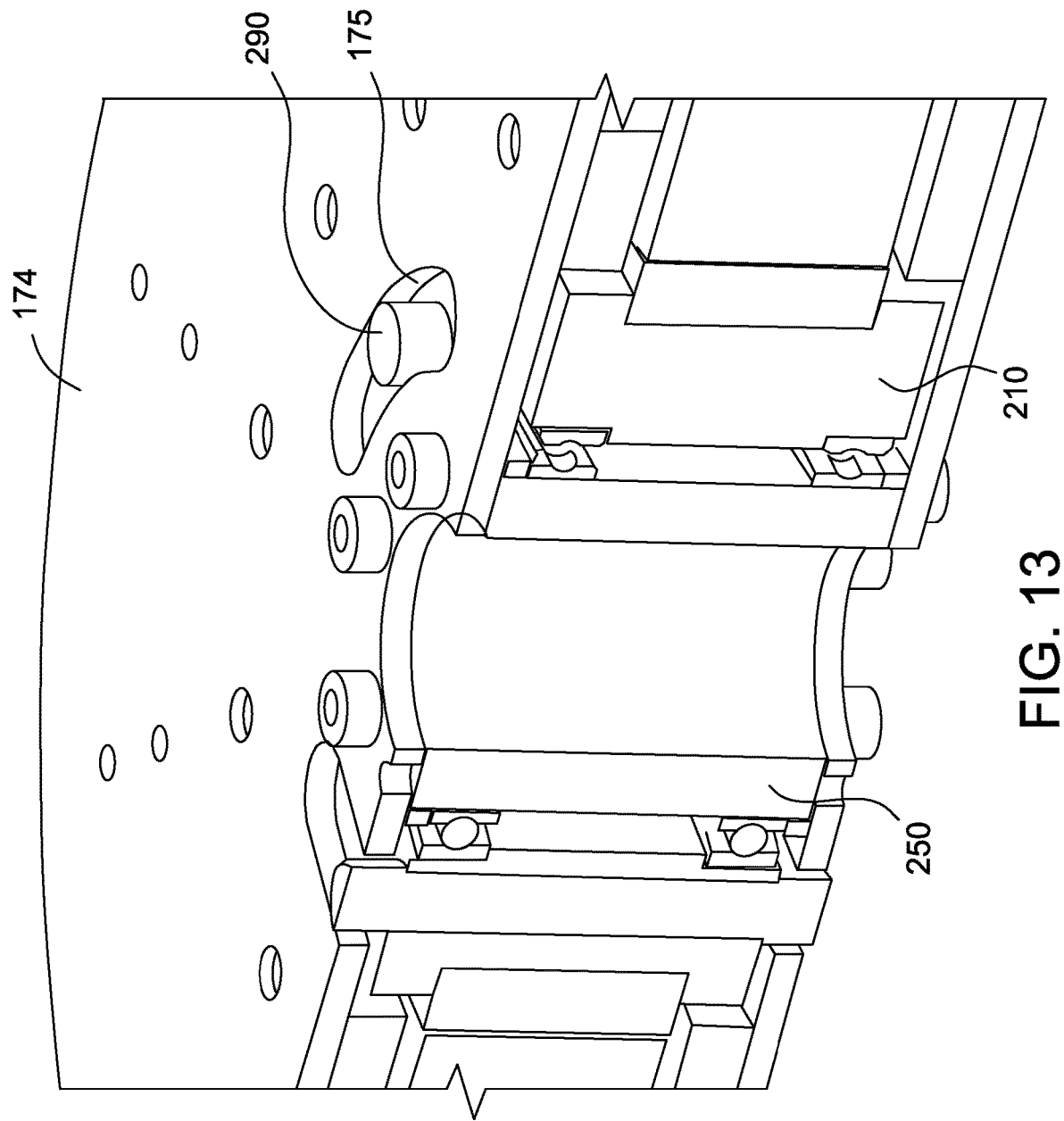
FIG. 13 is a cross-sectional view of the of the rotor assembly shown in FIG. 4.

As the intra-rotor angle is increased from 0 degrees, the end magnets 166 are urged to return to an intra-rotor angle of 0 degrees due to magnetic forces. In some embodiments, as the inner hub 210 rotates with the shaft 136 on initial startup, inertia of the system applies torque to the inner hub 210 relative to the drum 250 causing the least one tab 216 to overcome, at least partially, the magnetic force and rotate relative to the at least one radial pocket 270, resulting in an increase in the torque constant. By increasing the torque constant during startup, the efficiency of the motor 100 is placed in a high torque state having a torque constant greater than T1 (i.e., the torque constant value T2 or Tx). As the motor 100 operates at a near constant speed and torque on the system is relaxed, the least one tab 216 returns to rest, or near rest (at intra-rotor angle of 0), placing the motor 100 in the low torque high speed state (i.e., the torque constant value T1 or Tx). Likewise, in any application where additional torque is applied to the motor 100 (i.e., increased load on the motor), the least one tab 216 is rotated relative to the at one radial pocket 270 due to the additional torque applied to the system, resulting in greater motor efficiency during a high torque state. As the torque is reduced, the motor 100 is placed into low torque constant mode providing higher speed and improved efficiency In some embodiments, the at least one tab 216 is mechanically held relative to the least one radial pocket 270 as shown in FIG. 13 such that the motor 100 operates at one of the aforementioned torque constant values. Stated differently, the rotor assembly has fixed torque constant of T1, T2 or Tx. In some embodiments, the at least one tab is mechanically held relative to the at least one radial pocket 270 by conventional means known in the art. In some embodiments, at least one of the end plates (174, 176) includes a radial slot 175. A pin 290 coupled to the drum 250 is movable within the radial slot 175 such that movement of the pin 290 within the radial slot 175 also moves the drum 250 relative to the inner hub 210. As best shown in FIGS. 10 and 13, the pin 290 extends at least partially through the drum 250. In some embodiments, the pin 290 can be coupled to a secondary motor or actuator configured to move the pin 290 relative to the radial slot 175. In some embodiments, the pin 290 can be mechanically fastened to at least one of the end plates (174, 176). By way of example, the pin 290 can include a threaded end which can be bolted onto at least one of the end plates (174, 176), removable holding the drum 250 relative to the inner hub at an intra-rotor angle.

Described herein are exemplary systems and apparatus that reduce eddy current loses and to increase the torque and efficiency of an electric motor. The systems and apparatus described herein may be used in any suitable application.

Specifically, eddy current losses into surrounding conductive structures can be eliminated or reduced by preventing flux leakage from the axial face of radial spoke rotors. The end plates described herein provide a barrier to the flux radiating from the rotor core into the surrounding structure of the motor assembly and therefore eliminates eddy current losses. Eddy current losses are reduced, for example, from 146 W to 10 W (93% reduction). Adding axial magnets and rotor steel end caps to radial spoked rotors increases efficiency and torque by preventing flux leaking axially which induce eddy currents in surrounding conductive structure. Additionally, some elements of the rotor assembly described herein are more simply manufactured compared to other known rotor assemblies due to the use of mechanical fasteners to secure the components of the rotor assembly together. In such an embodiment, tooling and processes used to over-mold the rotor is no longer required, thus leading to reduced manufacturing time and costs.

Exemplary embodiments of rotor cores for electric machines are described above in detail. The electric motor and its components are not limited to the specific embodiments described herein, but rather, components of the systems may be utilized independently and separately from other components described herein. For example, the components may also be used in combination with other motor systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A rotor assembly for use in a radial flux electric motor assembly, said rotor assembly comprising:
    a rotatable rotor shaft coupled to a rotor core, the rotor core comprising a plurality of rotor poles circumferentially spaced about a central axis of the rotor shaft, wherein said rotor core comprises a plurality of core magnets alternately spaced with said plurality of rotor poles;
    at least one end plate connected to the rotatable rotor shaft, the at least one end plate positioned over the rotor core, wherein the at least one end plate comprises a plurality of end magnets coupled to the at least one end plate; and
    wherein the plurality of end magnets is positioned over the core magnets when the rotor assembly is at rest, wherein the rotor assembly has a first torque constant at rest, wherein the plurality of end magnets can rotate relative to the core magnets upon application of torque to the rotor assembly, wherein the rotor assembly has an intermediate torque constant application of torque to the rotor assembly.

2. The rotor assembly of claim 1, wherein said plurality of end magnets comprises a first plurality of end magnets coupled to a first end plate of the at least one end plate and a second plurality of end magnets coupled to a second end plate of the at least one end plate.

3. The rotor assembly of claim 2, wherein the first plurality of end magnets comprises a first subset of end magnets having a first polarity and a second subset of end magnets having a second polarity opposite the first polarity, and wherein the first subset of end magnets is alternately spaced with the second subset of end magnets.

4. The rotor assembly of claim 1, wherein each end magnet covers an interface between a rotor pole of the plurality of rotor poles and an adjacent core magnet of the plurality of core magnets.

5. The rotor assembly of claim 1, further comprising a hub assembly having an inner hub and a drum surrounding the inner hub, the inner hub coupled to the rotatable shaft and rotatable with the rotatable shaft and the drum rotatable relative to the inner hub, the inner hub connected to the at least one end plate and the drum connected to the rotor core.

6. The rotor assembly of claim 5, wherein the drum is rotatable relative to the inner hub by an intra-rotor angle which defines an angle by which the plurality of end magnets shifts relative to the core magnets altering path for flux to flow between the plurality of end magnets and the plurality of core magnets.

7. The rotor assembly of claim 6, wherein the rotor assembly provides a second torque constant upon rotating the drum relative to the inner hub from rest by the intra-rotor angle.

8. The rotor assembly of claim 7, wherein the inner hub includes at least one tab extending from an outer surface of the inner hub and the drum includes at least one radial pocket extending partially through an inner sidewall of the drum, the at least one tab configured to rotate within the at least one radial pocket such that the inner hub rotates relative to the drum.

9. The rotor assembly of claim 8, wherein the at least one radial pocket is an arc having an arc angle, wherein the intra-rotor angle is half of the arc angle.

10. The rotor assembly of claim 9, wherein the at least one radial pocket defines a first stop and a second stop, the at least one tab rotatable between the first stop and the second stop, wherein the at least one tab remains equidistant between the first stop and second stop at rest.

11. The rotor assembly of claim 10, wherein the at least one tab rotates towards either the first stop or second stop upon application of torque onto the rotatable rotor, and wherein the at least one tab returns to rest upon relaxing of torque onto the rotatable rotor.

12. The rotor assembly of claim 11, wherein the torque constant increases from the first torque constant at rest to a second torque constant or an intermediate torque constant upon application of torque onto the rotatable rotor, the second torque constant greater than the first torque constant, and the intermediate torque constant greater than the first torque constant and less than the second torque constant.

13. The rotor assembly of claim 12, the at least one tab is mechanically held relative to the least one radial pocket such that the rotor assembly has a fixed torque constant.

14. The rotor assembly of claim 13, wherein the drum is mechanically held relative to the inner hub by a fixed pin coupled to the drum, the fixed pin extending through a radial slot of at least one of the end plates.

15. The rotor assembly of claim 14, wherein the fixed pin is mechanically fastened to at least one of the end plates.

16. An electric motor assembly comprising:
    a stator assembly comprising a stator core and a plurality of windings; and a rotor assembly comprising:
- a rotor core rotor core comprising a plurality of rotor poles circumferentially spaced about a central axis of a rotatable shaft, wherein said rotor core comprises a plurality of core magnets alternately spaced with said plurality of rotor poles;
- at least one end plate connected to the rotatable rotor shaft, the at least one end plate positioned over the rotor core, wherein the at least one end plate comprises a plurality of end magnets coupled to the at least one end plate; and
- wherein the plurality of end magnets is positioned over the core magnets when the rotor assembly is at rest, wherein the rotor assembly has a first torque constant at rest, wherein the plurality of end magnets can rotate relative to the core magnets upon application of torque to the rotor assembly, wherein the rotor assembly has an intermediate torque constant application of torque to the rotor assembly.

17. The electric motor assembly of claim 16, further comprising a hub assembly having an inner hub and a drum surrounding the inner hub, the inner hub coupled to the rotatable shaft and rotatable with the rotatable shaft and the drum rotatable relative to the inner hub, the inner hub connected to the at least one end plate and the drum connected to the rotor core.

18. The electric motor assembly of claim 17, wherein the drum is rotatable relative to the inner hub by an intra-rotor angle which defines an angle by which the plurality of end magnets shifts relative to the core magnets altering the path for flux to flow between the plurality of end magnets and the plurality of core magnets.

19. The electric motor assembly of claim 18, wherein the rotor assembly has a second torque constant upon rotating the drum relative to the inner hub from rest by the intra-rotor angle.

20. The electric motor assembly of claim 19, wherein the inner hub includes at least one tab extending from an outer surface of the inner hub and the drum includes at least one radial pocket extending partially through an inner sidewall of the drum, the at least one tab configured to rotate within the at least one radial pocket such that the inner hub rotates relative to the drum, wherein the intra-rotor angle is half of an arc angle, wherein the at least one tab remains equidistant between arc angle at rest, wherein the at least one tab rotates from rest upon application of torque onto the electric motor assembly, and wherein the at least one tab returns to rest upon relaxing of torque onto the rotatable rotor.

* * * * *